United States Patent
Kamijima et al.

(10) Patent No.: US 7,947,434 B2
(45) Date of Patent: May 24, 2011

(54) PROCESS FOR FORMING A PLATED FILM, AND PROCESS FOR FABRICATING A MAGNETIC DEVICE AND PERPENDICULAR MAGNETIC RECORDING HEAD

(75) Inventors: Akifumi Kamijima, Tokyo (JP); Hitoshi Hatate, Tokyo (JP); Hideyuki Yatsu, Tokyo (JP)

(73) Assignee: TDK Corporation, Tokyo (JP)

(*) Notice: Subject to any disclaimer, the term of this patent is extended or adjusted under 35 U.S.C. 154(b) by 906 days.

(21) Appl. No.: 11/671,758

(22) Filed: Feb. 6, 2007

(65) Prior Publication Data

US 2008/0187654 A1 Aug. 7, 2008

(51) Int. Cl.
 *G03F 1/00* (2006.01)
(52) U.S. Cl. ..... 430/323; 430/313; 430/317; 430/270.1; 427/128; 427/129
(58) Field of Classification Search .................. 427/128, 427/129; 430/313, 317, 270.1
See application file for complete search history.

(56) References Cited

U.S. PATENT DOCUMENTS

| | | | |
|---|---|---|---|
| 5,721,078 A | 2/1998 | Kamijima | |
| 5,725,997 A | 3/1998 | Kamijima | |
| 5,747,198 A | 5/1998 | Kamijima | |
| 6,635,408 B2 | 10/2003 | Kamijima | |
| 7,417,825 B2 * | 8/2008 | Sasaki et al. | 360/125.07 |

FOREIGN PATENT DOCUMENTS

| | | |
|---|---|---|
| JP | 2001-167407 | 6/2001 |
| JP | 2006-18985 | 1/2006 |
| JP | 2006-201227 | 8/2006 |

OTHER PUBLICATIONS

U.S. Appl. No. 11/677,245, filed Feb. 21, 2007, Kamijima.
U.S. Appl. No. 11/674,374, filed Feb. 13, 2007, Kamijima.

* cited by examiner

*Primary Examiner* — Gregory R Del Cotto
(74) *Attorney, Agent, or Firm* — Oblon, Spivak, McClelland, Maier & Neustadt, L.L.P.

(57) ABSTRACT

The process of forming a plated film according to the invention is designed such that the surface asperities of the inorganic film formed by the tracing of a standing wave occurring at the inner wall surface of the first opening in the resist at the resist pattern-formation step are reduced or eliminated. It is thus possible to form, efficiently yet in a short period of time, a high aspect-ratio plated film portion having an aspect ratio of greater than 1. In addition, the formed plated film quality is extremely improved for the absence of pores (cavities).

9 Claims, 6 Drawing Sheets

PROCESS FOR FORMING A PLATED FILM, AND PROCESS FOR FABRICATING A MAGNETIC DEVICE AND PERPENDICULAR MAGNETIC RECORDING HEAD

BACKGROUND OF THE INVENTION

1. Field of the Invention

The present invention relates to a process for forming a plated film having a plated film portion having an aspect ratio of as high as 1 or greater, and a process for fabricating a magnetic device, and a perpendicular magnetic recording head using that process.

2. Explanation of the Prior Art

In the field of fabrication of various devices, frame plating techniques have so far been widely used for micropattern formation. According to one typical frame plating, a seed film is formed as an electrode film on one surface of a substrate, and a frame (a pattern film having an opening) is then formed on the seed film, after which a plated film is grown on a portion of the seed film exposed at the bottom of the opening to form a plated film pattern.

In the field of fabrication of various magnetic devices, there is often the need of forming a micro-pattern comprising a plated portion (high aspect-ratio portion) having an aspect ratio ((thickness/width) ratio) of greater than 1. Taking a perpendicular magnetic recording head as an example of the magnetic device, it is a magnetic pole layer that is corresponding to this type of micropattern, said magnetic pole layer having a function of guiding a magnetic flux to a magnetic recording medium, and having a microfine width portion for defining the recording track width of that magnetic recording medium.

For the efficient formation of a micropattern having a high aspect ratio within a short period of time, there is an improved frame plating technique now available, with which not only is a film formed by plating from the bottom of an opening but a film is also formed by plating along the inner wall surface from the opening. This improved frame plating technique typically involves the following steps: a resist pattern having an opening (in the form of, for instance, a concave groove) is formed, then an inorganic film is formed at the bottom and inner wall surface of the opening in the resist pattern, then a seed film is formed as an electrode film on the inorganic film, and finally a plated film is grown from the bottom and inner wall surface of the opening with the seed film formed over it.

However, when a photoresist coated on the surface of a substrate is exposed to monochromatic light for the purpose of forming a resist pattern having an opening (in the form of, for instance, a concave groove), there is a portion where light entering the resist and light reflected off the surface of the substrate are well periodically amplified according to wavelengths. This in turn causes a standing wave to be created at the inner wall surface of the resist at a site with the opening formed according to an amplified period. As, in the presence of this standing wave, the seed film working as the electrode film is formed on that via the inorganic film, it causes the standing wave to remain on the inner wall surface of the seed film in a wave form traced from that standing wave as it stands. As, in this state, the opening is buried up by a plated film that grows from the bottom and inner wall surface of the opening that provides a base for a high aspect-ratio plated film portion, there are pores (cavities) likely to occur within the plated film under increased influences of plating growth from the inner wall surface at which the standing wave is present. When the plated film having such pores (cavities) is used as the main magnetic pole of a perpendicular magnetic head as an example, there is a disruption in the magnetic domain structure of the main magnetic pole, or a plating solution remaining in the pores (cavities), which may otherwise end up with corrosion. As a result, the performance of the perpendicular-magnetic head becomes severely worse, or it does no longer function.

One possible approach to prevention of creation of standing waves is to form an antireflection film on the substrate (under the resist). However, for instance, it is very difficult to use an organic antireflection film with the process of forming the magnetic pole of a perpendicular magnetic head because of its process considerations. On the other hand, the use of an inorganic antireflection film comprising a nitride, because of having a very high hardness, may often cause much troubles at a head processing step. In other words, it is a presupposition to form the magnetic pole without using any antireflection film.

The invention of this application has been made with such situations in mind, and has for the object the provision of a process of fabricating a plated film, which enables a plated film portion having an aspect ratio of as high as 1 or greater to be efficiently formed in a short period of time and ensures that the formed plated film quality is very excellent for the reason of being free from pores (cavities), and a process of fabricating a magnetic device, and a perpendicular magnetic recording head using that process.

SUMMARY OF THE INVENTION

According to the present invention, such problems as mentioned above are solved by the provision of a process of forming a plated film having a high aspect-ratio plated film portion having an aspect ratio of 1 or greater as defined by a depth-to-width ratio, which comprises:

a step of providing a substrate;

a resist pattern-formation-step of forming a resist pattern having a first opening that provides a base for the high aspect-ratio plated film portion having an aspect ratio of 1 or greater,     an inorganic film-formation step of applying an inorganic film on at least a bottom and inner wall surface of said first opening,     a flattening step of flattening a surface of said inorganic film formed at said inorganic film-formation step to flatten the surface of the inorganic film formed on the inner wall surface of said first opening so as to eliminate surface asperities of said inorganic film formed by tracing of a standing wave occurring at the inner wall surface of the first opening in said resist at said resist pattern-formation step,     a seed film-formation step of forming on the inorganic film at the first opening a seed film that provides a plating seed, and     a plated film-formation step of growing a plated film comprising a magnetic material in such a way as to fill up said first opening.

In a preferable embodiment of the process of forming a plated film according to the invention, flattening at said flattening step of flattening the surface of said inorganic film is milling, reactive ion etching (RIE), or wet etching using an alkali aqueous solution as an etchant.

In a preferable embodiment of the process of forming a plated film according to the invention, the surface configuration of said flattened inorganic film at said inner wall surface has no trace of the surface configuration of said inorganic film on its side in contact with the resist.

In a preferable embodiment-of the process of forming a plated film according to the invention, there is additionally a plated film-flattening step of applying further flattening to said plated film until a part of the surface of said inorganic film is removed or the resist pattern is exposed to view, wherein said plated film-flattening step is implemented after said plated film-formation step.

In a preferable embodiment of the process of forming a plated film according to the invention, there is additionally a resist removal step of removing the resist pattern, wherein said resist removal step is implemented after said plated film-flattening step.

In a preferable embodiment of the process of forming a plated film according to the invention, there is additionally a flattening film-formation step of forming a flattening film for achieving further flattening, wherein said flattening film-formation step is implemented after said flattening film-formation step.

In a preferable embodiment of the process of forming a plated film according to the invention, said resist pattern-formation step involves forming a photoresist film on one surface of the substrate, and then subjecting said photoresist film to selective exposure and development, thereby forming a resist pattern having said first opening.

The present invention also provides a process of fabricating a magnetic device having a magnetic film, wherein said process of forming a plated film is used to form a magnetic film in such a way as to have a high aspect-ratio plated film portion buried in a first opening.

Further, the present invention provides a process of fabricating a perpendicular magnetic recording head comprising a thin-film coil adapted to generate a magnetic flux and a magnetic pole layer adapted to guide a magnetic flux produced at said thin-film coil to a magnetic recording medium, wherein said process of forming a plated film is used to form a magnetic pole layer in such a way as to have a high aspect-ratio plated film portion buried in a first opening.

In accordance with the inventive process of forming a plated film having a high aspect-ratio plated film portion having an aspect ratio of 1 or greater as defined by a depth-to-width ratio, which comprises a step of providing a substrate, a resist pattern-formation step of forming a resist pattern having a first opening that provides a base for the high aspect-ratio plated film portion having an aspect ratio of 1 or greater, an inorganic film-formation step of applying an inorganic film on at least a bottom and inner wall surface of said first opening, a flattening step of flattening a surface of said inorganic film formed at said inorganic film-formation step to flatten the surface of the inorganic film formed on the inner wall surface of said first opening so as to eliminate surface asperities of said inorganic film formed by tracing of a standing wave occurring at the inner wall surface of the first opening in said resist at said resist pattern-formation step, a seed film-formation step of forming on the inorganic film at the first opening a seed film that provides a plating seed, and a plated film-formation step of growing a plated film comprising a magnetic material in such a way as to fill up said first opening, it is possible to form, efficiently yet within a short period of time, a high aspect-ratio plated portion having an aspect ratio of as high as 1 or greater. In addition, the formed plated film quality is much more improved for the reason of being free from pores (cavities).

DETAILED EXPLANATION OF THE INVENTION

The present invention is now explained with reference to the best mode for carrying out it.

Before an account is given of how to form the plated film according to the invention, a perpendicular magnetic recording head comprising a magnetic pole layer having a microfine width portion—one example of the member to which the inventive plated film formation process is preferably applied is first explained with reference to FIGS. 1A, 1B and 2. Note here that the perpendicular magnetic recording head is referred to as a mere preferable example out of magnetic devices; the structure and material of the thin-film magnetic head exemplified below could assume on various forms.

Figures 1A, 1B:
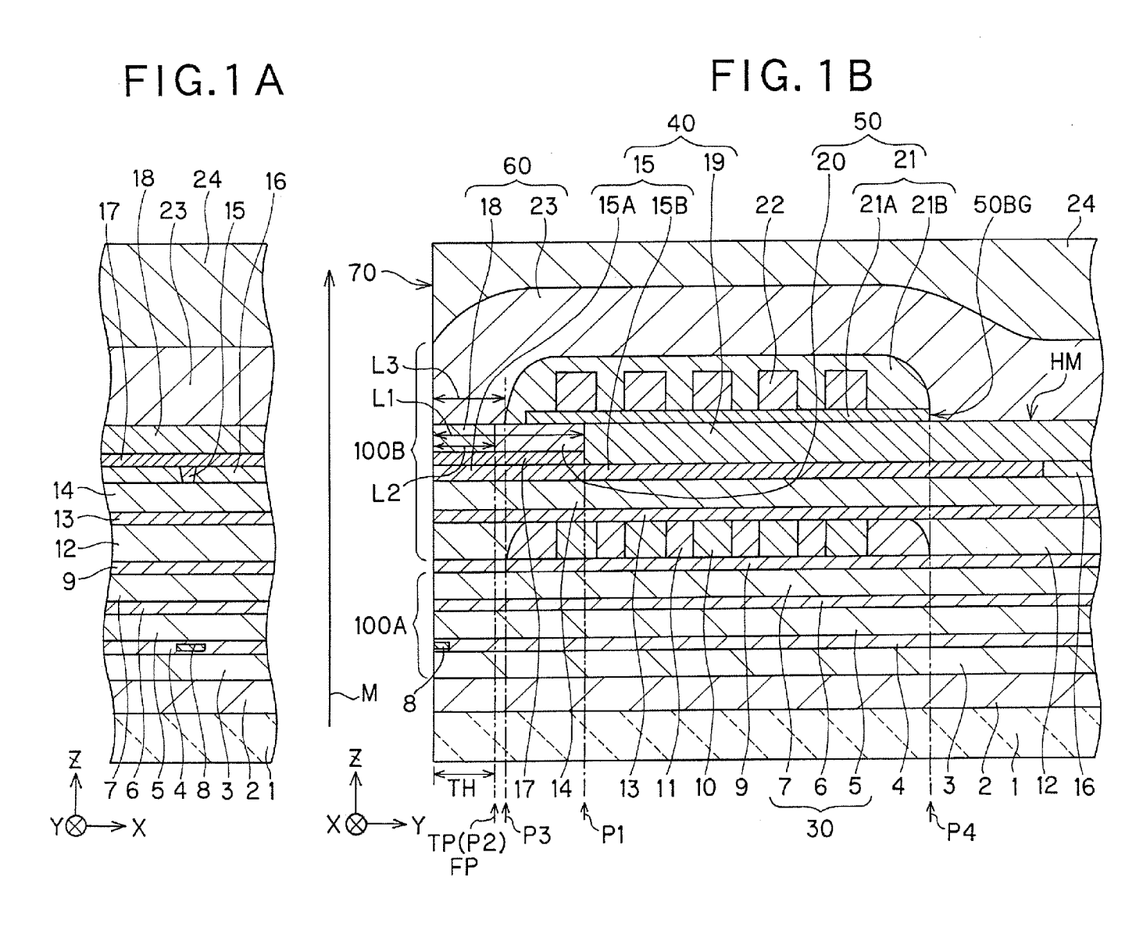
FIG. 1A is a sectional view of a thin-film magnetic head parallel with the so-called air bearing surface (ABS)
FIG. 1B is a sectional view of the thin-film magnetic head orthogonal to the air bearing surface.

FIG. 1A is a sectional view of a thin-film magnetic head parallel with the so-called-air bearing surface (ABS), and FIG. 1B is a sectional view of the thin-film magnetic head orthogonal to the air bearing surface. The air bearing surface (ABS) here is tantamount to a plane at which the thin-film magnetic head is opposed to a magnetic recording medium (hereinafter often called the medium opposite plane). FIG. 2 is an enlarged, perspective view of the vicinity of a magnetic pole layer adapted to implement perpendicular magnetic recording.

Certain terminology may be used in the following description for convenience in reference only. For instance, the word "width" would refer to a dimension in the X-axis direction shown in the drawings inclusive of FIGS. 1A, 1B and 2, the "length" to a dimension in the Y-axis direction, and the "thickness" to a dimension in the Z-axis direction. Similarly, the word "front" would refer to a side nearer to the air bearing surface (the surface of the thin-film magnetic head opposed to the recording medium) in the Y-axis direction, and the "rear" to the opposite side (a depth side).

The thin-film magnetic head shown in FIGS. 1A and 1B is used on a magnetic recording system such as a hard disk drive for the purpose of applying magnetic processing to a recording medium moving in the direction M of travel of the medium, for instance, a hard disk.

For instance, the thin-film magnetic head illustrated in the drawings is a composite type head capable of implementing both recording and reproducing as magnetic processing. The structure comprises, as shown in FIG. 1, a substrate 1 made of a ceramic material such as AlTiC ($Al_2O_3.TiC$), and an insulating layer 2 made of a nonmagnetic insulating material such as aluminum oxide ($Al_2O_3$; hereinafter referred simply as alumina), a reproducing head portion 100A adapted to reproduce magnetic information recorded by harnessing the magneto-resistive (MR) effect, a separation layer 9 made of a nonmagnetic insulating material such as alumina, a shield type recording head portion 100B adapted to implement a perpendicular recording mode of recording processing, and an overcoat layer 24 made of a nonmagnetic insulating material such as alumina, all stacked one upon another on the substrate 1 in that order.

For instance, the reproducing head portion 100A has a multilayer structure comprising a lower read shield layer 3, a shield gap film 4 and an upper read shield layer 30 stacked one upon another in that order. In the shield gap layer 4, there is a magneto-resistive effect device (MR device) 8 embedded as a reproducing device in such a way that its one end face is exposed on the recording medium opposite plane (air bearing surface) 70.

Both the lower 3 and the upper read shield layer 30 are provided to separate the MR device magnetically from the surroundings, extending rearward from the air bearing surface 70. The lower read shield layer 3 is made of a soft magnetic material such as permalloy (Ni(80 wt %)Fe(20 wt %)) that is a nickel-iron alloy, and has a thickness of about 1.0 to 2.0 μm.

In the embodiment here, the upper read shield layer 30 is divided in two shield layers 5 and 7 via a non-magnetic layer 6 in a thickness direction. In other words, that upper read shield layer 30 has a structure where the upper first read shield layer 5, the nonmagnetic layer 6 and the upper second read shield layer 7 are stacked one upon another in order.

The upper first read shield layer 5 is made of a magnetic material such as permalloy, and has a thickness of typically about 1.5 μm. The upper second read shield layer is made of a magnetic material such as permalloy, too, and has a thickness of typically about 1.1 μm. The nonmagnetic layer 6 is made of a nonmagnetic material such as ruthenium (Ru) or alumina, and has a thickness of typically about 0.2 μm.

While it is shown and described that the upper read shield layer 30 has a multilayer structure, it is contemplated that it is not always required to have a multilayer structure; it could have a single-layer structure as is the case with the lower read shield layer 3.

The shield gap film 4 is provided to separate the MR device 8 electrically from the surroundings; for instance, it is made of a nonmagnetic material such as alumina.

The MR device operates in such a way as to implement reproducing processing by making use of typically the giant magneto-resistive (GMR) effect. Instead of the GMR device, a CPP-GMR device or a TMR (tunneling magneto-resistive effect) device could also be used.

The recording head portion 100B, for instance, has a multilayer structure comprising a first-stage thin-film coil 10 buried around with insulating layers 11, 12, 13, a nonmagnetic layer 14, a main magnetic pole layer 40 partially buried around with an insulating layer 16, a gap layer 17, a second-stage thin-film coil 22 buried with an insulating layer 50 that forms a magnetic coupling opening (back gap 50 BG) and a write shield layer 60, all stacked one upon another in order.

Figure 2:
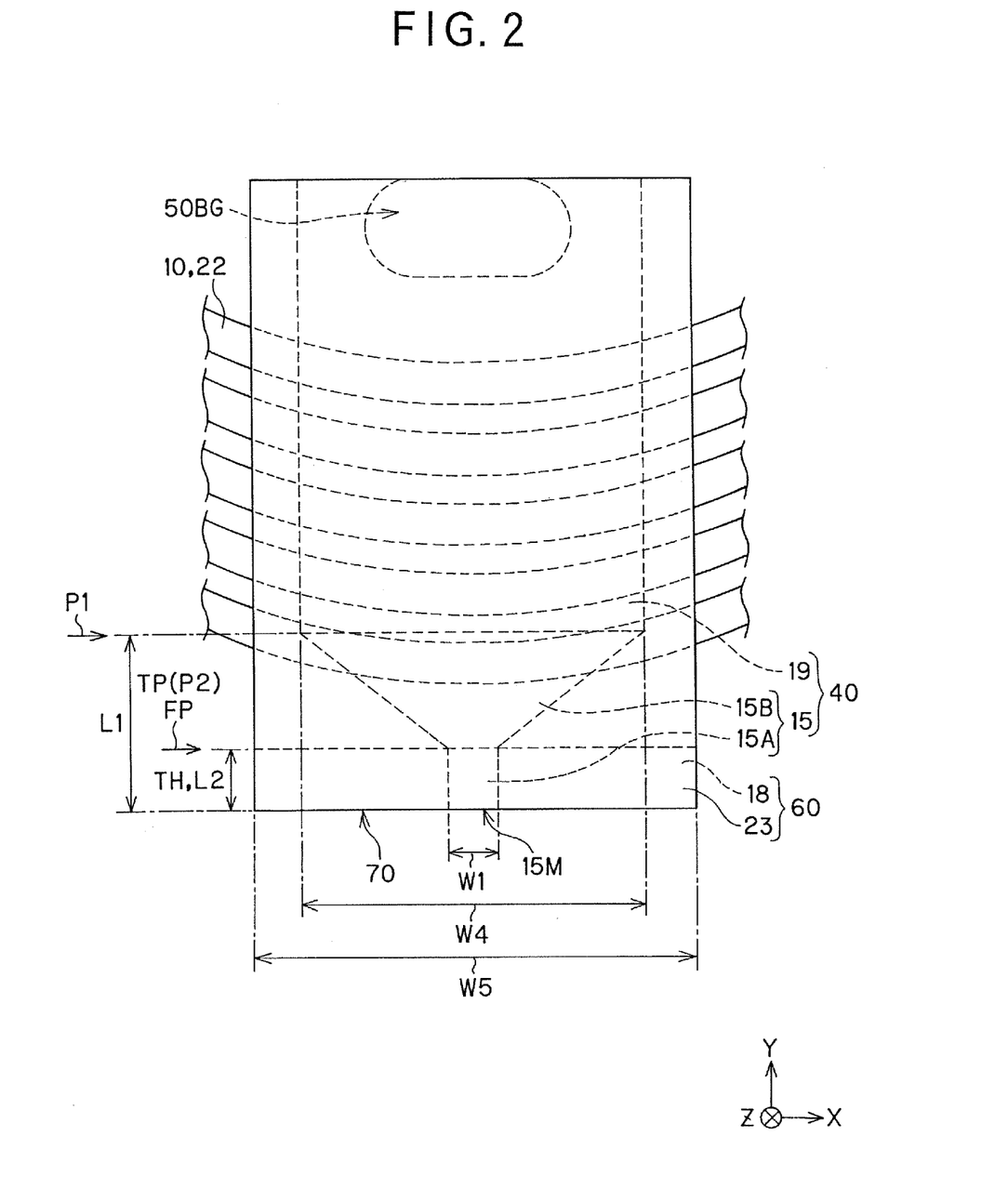
FIG. 2 is an enlarged, perspective view of part of the thin-film magnetic head shown in FIGS. 1A and 1B.

In FIG. 2, only a main part (thin-film coils 10, 22, main magnetic pole layer 40 and write shield layer 60) extracted out of the recording head portion 100B is primarily shown.

The thin-film coil 10 has a primary function of generating a leakage-preventive magnetic flux for holding back leakage of a recording magnetic flux produced at the thin-film coil 22. This thin-film coil 10 is made of a highly electroconductive material such as copper, and has a thickness of typically about 2.0 μm.

As typically shown in FIGS. 1 and 2, the thin-film coil 10 in particular has a spiral structure having turns about the back gap 50BG. The thin-film coil 10 typically operates such that currents flow in a direction opposite to the direction taken by currents flowing through the thin-film 22. While it is shown in FIGS. 1 and 2 that the thin-film coil 10 has five turns by way of illustration alone, it is contemplated that the number of turns could optionally be varied. Preferably, the thin-film coil 10 should have as many turns as the thin-film coil 22, for instance, 2 to 7 turns. The thin-film coil 10 may just as well be used in a helical coil form.

The insulating layers 11, 12, 13 are formed in such a way as to separate the thin-film coil 10 electrically from the surroundings. The insulating layer 11 is formed in such a way as to be filled up between the turns of the thin-film coil 10 and provide a cover around the thin-film coil 10. This insulating layer 11 is made of a non-magnetic insulating material such as a photoresist (photosensitive resin) exhibiting fluidity upon heating, and has a thickness of typically about 2.0 μm.

In the embodiment here, the insulating layer 11 is formed in such a way as to cover only the sides of the thin-film coil 10 but provide no cover to the upper side of the thin-film coil 10, as shown in FIG. 1.

The insulating layer 12 is formed in such a way as to provide a cover around the insulating layer 11. This insulating layer 12 is made of a nonmagnetic material such as alumina, and has a thickness of typically about 2.0 μm.

The insulating layer 13 is formed in such a way as to give a cover to the thin-film coil 10 as well as the insulating layers 11, 12. This insulating layer 13 is made of a nonmagnetic material such as alumina, and has a thickness of typically about 0.2 μm.

The nonmagnetic layer 14 is formed of a nonmagnetic insulating material such as alumina, or a nonmagnetic electroconductive material such as ruthenium, and has a thickness: of typically about 1.0 μm.

The main magnetic pole layer 40 has a primary function of implementing recording processing by receiving a magnetic recording magnetic flux produced at the thin-film coil 22 and releasing that magnetic flux toward the recording medium. More specifically, it produces a magnetic field (perpendicular magnetic field) for magnetizing the recording medium in a direction orthogonal to its surface on the basis of a recording magnetic flux for the perpendicular recording mode of recording processing.

Such a main magnetic pole layer 40 is located on the leading side of the thin-film coil, extending rearward from the air bearing surface 70, more specifically, as far as the back gap 50 BG. It is noted that when the state of movement of the recording medium that moves toward the direction M of travel of the medium shown in FIG. 1 is viewed as a sort of flow, the aforesaid "leading side" would refer to the incoming side-(opposite to the medium travel direction M side) of that flow that is here corresponding to the upstream side in the thickness (Z-axis) direction. On the other hand, the outgoing side of the flow (the medium travel direction M side) would be called the "trailing side" that is here corresponding to the downstream side in the thickness direction.

In the embodiment here, the main magnetic pole layer 40 has a structure where, as shown in FIG. 1, a main magnetic pole layer 15 and a magnetic pole dominant layer 19 are stacked one upon another in order and thereby coupled to each other. In other words, it has a multilayer (double-layer) structure where the main magnetic pole 15 is located on the leading side and the magnetic pole main layer 19 is located on the trailing side.

The main magnetic pole 15 functions as a portion for releasing off a main writing magnetic flux. This main magnetic pole 15 extends rearward from the air bearing surface 70 on the leading side, more specifically, as far as the back gap 50 BG, and has a thickness of typically about 0.25 μm. Such main magnetic pole 15, for instance, is made of a magnetic material that is higher in saturation flux density than the magnetic material of which the magnetic pole dominant layer 19 is made, specifically, an iron alloy or the like. The iron alloy here, for instance, includes an iron-nickel alloy (FeNi), an iron-cobalt alloy (FeCo) or an iron-cobalt-nickel alloy (FeCoNi), all rich in iron (Fe).

It is noted that the aforesaid "coupled" would mean just only a coupling involving physical contact but also a coupling involving physical contact plus a magnetically conductive coupling.

As shown in FIG. 2, the main magnetic pole 15 is configured in a generally battledore type planar shape. To be more specific, the main magnetic pole 15 comprises, in order from the air bearing surface 70, a front end 15A that extends rearward from that air bearing surface 70 and having a constant width W1 for defining the recording track width of the recording medium and a rear end 15B that is linked to the rear of that front end 15A and having a width W4 greater than the width W1 (W4>W1). The position at which the width of the main magnetic pole 15 starts growing wide from the front end 15A (of width W1) toward the rear end 15B (of width W4) is a "flare point FP" that is one of important determinants for the recording performance of the thin-film head. Note here that the main magnetic pole 15 may just as well be magnetically coupled to the magnetic pole dominant layer 19 by contact with it only along its bottom (on the substrate side).

The front end 15A is primarily adapted to substantially release a recording magnetic flux produced at the thin-film coil 22 toward the recording medium, and has an exposed surface 15M exposed on the air bearing surface 70, as shown in FIG. 2. As shown typically in FIG. 3, the exposed surface 15M takes a planar shape defined by an upper end edge (one end edge) El (of width W1) positioned on the trailing side, a lower end edge (another end edge) E2 (of width W3) positioned on the leading side, and two side end edges S1, S2. To be more specific, the exposed surface 15M typically assumes on a trapezoidal shape with its width becoming gradually narrow from the trailing side toward the leading side (W1>W3). The trailing edge E1 of the front end 15A provides a substantial recording site of the main magnetic pole layer 40.

The rear end 15B shown in FIG. 2 is adapted to receive the magnetic flux received in the magnetic pole dominant layer 15 and feed it to the front end 15A. Typically, the width of this rear end 15B remains constant (width W4) in the rear, and becomes gradually narrow from width W4 to width W1 in the front as the front end 15A comes near.

The magnetic pole dominant layer 19 functions as a portion adapted to receive a dominant magnetic flux. Typically, this magnetic pole dominant layer 19 extends rearward from a position P1 (the first position) receded from the air bearing surface 70. To be more specific, it extends as far as the rear of the main magnetic pole 15 at the back gap 50BG, and has a thickness of typically about 0.45 μm. In particular, the magnetic pole dominant layer 19 is made of a magnetic material lower in saturation flux density than the magnetic material of which the main magnetic pole 15 is made. A preferable example is an iron-cobalt-nickel alloy.

As shown typically in FIG. 2, the magnetic pole dominant layer 19 has a rectangular planar shape of width W4. In the magnetic pole dominant layer 19 in particular, both an auxiliary insulating layer 20 of the insulating layer 50 to be described later and a TH defining layer 18 of the write shield layer 60 to be described later are flattened. That is, the end face of the magnetic pole dominant layer 19 on the trailing side forms a flat plane HM together with the end face of the auxiliary insulating layer 20 on the trailing side and the end face of the TH defining layer 18 on the trailing side.

The insulating layer 16 is provided to isolate the main magnetic pole 15 electrically from the surroundings. This insulating layer 16 is made of a nonmagnetic insulating material such as alumina, and has a thickness of typically about 0.25 μm.

The gap layer 17 is formed in such a way as to provide a gap for the magnetic separation of the main magnetic layer 40 from the write shield layer 60. As typically shown in FIG. 1, the gap layer 17 extends rearward from the air bearing surface 70 along the main magnetic pole 15 except an area with the magnetic pole dominant layer 19 located on it. In particular, the gap layer 17 is made of a nonmagnetic insulating material such as alumina or a nonmagnetic electroconductive material such as ruthenium, and has a thickness of typically about 0.03 to 01 μm.

The insulating layer 50 defines the throat height TH that is one of important determinants for the recording performance of the thin-film magnetic head, and is adapted to cover the thin-film coil 22 in such a way as to isolate it electrically from the surroundings. As shown in FIG. 1, the insulating layer 50 has a structure where an auxiliary insulating layer 20 (the first insulating layer portion) formed in such a way as to substantially define the throat height TH and a main insulating layer 21 (the second insulating layer portion) formed in such a way as to substantially cover the thin-film coil 22 are stacked one upon another in that order. It follows that there is a multilayer (double-layer) structure involved, wherein the auxiliary insulating layer 20 is located on the leading side and the main insulating layer 21 is located on the trailing side.

As shown in FIG. 1, the auxiliary insulating layer 20 extends along the gap layer 17 and from a position receded from the air bearing surface 70, viz., a position P2 (the second position) between the air bearing surface 70 and a position P1 to the position P1 in the rear. And, the auxiliary insulating layer 20 is provided in such a way as to be adjacent to the magnetic pole dominant layer 19 at the position P1, and adjacent to the write shield layer 60 (the TH defining layer 18 to be described later) at the position P2. In the embodiment here in particular, the auxiliary insulating layer 20 defines a flat plane HM together with the magnetic pole dominant layer 19 and TH defining layer 18.

The aforesaid "position P2" is corresponding to the foremost end position of the insulating layer 50 (nearest to the air bearing surface 70). That is, there is a "zero throat height position TP" for defining the throat height TH. That throat height TH is a distance between the air bearing surface 70 and the zero throat height position TP. This auxiliary insulating layer 20 is made of a nonmagnetic insulating material such as alumina. In the embodiment shown in FIGS. 1 and 2, the zero throat height position TP is in coincidence with the flare point FP.

As shown in FIG. 1, the main insulating layer 21 extends rearward from a position P3 (the third position) between the positions P1 and P2 while lying along the flat plane HN of the auxiliary insulating layer 20. More specifically, the main insulating layer 21 extends in such a way as not to fill up the back gap 50BG, and is receded from the auxiliary insulating layer 20. As shown typically in FIG. 1, this main insulating layer 21 comprises a main insulating layer portion 21A that is located as an underlay of the thin-film coil 22 on the flat plane HM of the auxiliary insulating layer 20, and a main insulating layer portion 21B that is located in such a way as to cover the thin-film coil 22 and the main insulating layer portion 21A around it.

The main insulating layer portion 21A is made of a nonmagnetic material such as alumina, and has a thickness of typically about 0.2 μm.

The main insulating layer portion 21B is made of a nonmagnetic insulating material such as photoresist or spin-on-glass (SOG) that exhibits fluidity upon heating. A portion of this main insulating layer portion 21B at and near its end edge is in such a rounded slant shape as to fall away toward that end edge.

The thin-film coil 22 is formed for the generation of a recording magnetic flux. For instance, the thin-film coil 22 operates such that currents flow in the direction opposite to the direction taken by currents through the aforesaid thin-film coil 10.

The write shield layer 60 works capturing the spreading component of a recording magnetic flux released off the main magnetic pole layer 40, thereby holding back the spreading of that magnetic flux. Located on the trailing side of the main magnetic pole layer 40 and thin-film coil 22, the write shield layer 60 extends rearward from the air bearing surface 70, whereby it is spaced by the gap film 17 away from the magnetic pole layer 20 on its side near to the air bearing surface 70, and linked to the magnetic layer 40 through the back gap 50BG in its side far away from the air bearing surface 70.

The write shield layer 60 here comprises the TH defining layer 18 (the first magnetic shield layer portion) and a yoke layer 23 (the second magnetic shield layer portion) that are separate from each other, and has a structure wherein the TH defining layer 18 and yoke layer 23 are coupled to each other. It is here noted that the write shield layer 60 is not limited to the couple structure as shown; it may be an integral structure.

The TH defining layer 18 functions as a dominant magnetic flux inlet port adapted to capture an extra portion of the magnetic flux released directly from the magnetic pole. As shown typically in FIG. 1, this TH defining layer 18 extends from the air bearing surface 70 as far as a position in the rear, more specifically, as far as the position P2 in front of the position P1 while lying adjacent to the gap layer 17, so that at that position P2 it lies adjacent to the auxiliary insulating layer 20 of the insulating layer 50.

The TH defining layer 18 is made of a magnetic material having a high saturation flux density such as permalloy or an iron-base alloy, and assumes on a rectangular planar shape having a width W5 greater than the width W4 of the main magnetic pole layer 40 (W5>W4), as shown in FIG. 2. In particular, the TH defining layer 18 forms the flat plane HM together with the magnetic pole dominant layer 19 and auxiliary insulating layer 20, as typically described above. In other words, the end face of the TH defining layer 18 on the trailing side forms the flat plane HM together with both the end face of the magnetic pole dominant layer 19 on the trailing side and the end face of the auxiliary insulating layer 20 on the trailing side. The TH defining layer 18 lies adjacent to the auxiliary insulating layer 20 at the position P2 as described above; that is, the TH defining layer 18 takes a substantial role of defining the foremost end position of the insulating layer 50 (the zero throat height position TP), thereby defining the throat height TH.

The yoke layer 23 is set up in such a way as to function as a passage for the magnetic flux captured out of the TH defining layer 18. Plus, it is constructed in such a way as to function as a return yoke through which the magnetic flux goes back from the lined layer of the medium. As shown typically in FIG. 1, the yoke layer 23 goes over the TH defining layer 18, extending at least as far as the back gap 50BG from the air bearing surface 70 via on the insulating layer 50. In other words, in the front, there is the yoke layer 23 going over the TH defining layer 18 and linked to it, and in the rear, there is the yoke layer 23 lying adjacent to the main magnetic pole layer 40 through the back gap 50BG and linked to it.

In the embodiment here, for instance, the yoke layer 23 extends as far as the rear of the back gap 50BG while linked to the main magnetic pole layer 40 at the back gap 50BG.

Such yoke layer 23, for instance, is made of a magnetic material similar to that of which the TH defining layer 18 is made, and takes a rectangular planar shape having a width W5 as shown in FIG. 2.

Preferably for the thin-film magnetic head as described above, a constant dimension defined on the basis of a specific component is optimized to make sure recording performance, as shown typically in FIG. 1. To be more specific, it is desired that the distance of the auxiliary magnetic pole 19 receded from the air bearing surface 70, viz., a distance L1 between the air bearing surface 70 and the position P1 be 0.8 to 7.1 μm. The distance of the main insulating layer 21 receded from the air bearing surface 70, viz., a distance L3 between the air bearing surface 70 and the position P3 is greater than the length of the TH defining layer 18, viz., a distance L2 between the air bearing surface 70 and the position P2 (L3>L2). In consideration of the structural relation where the distance L3 is greater than the distance L2, the write shield layer 60 is designed such that the length of a portion of the yoke layer 23 adjacent to the TH defining layer 18 (viz., the distance L3) is greater than the length of the TH defining layer (viz., the distance L2). In other words, when the magnetic flux is captured in the yoke layer 23 of the write shield layer 60 via the TH defining layer 18, the magnetic path taken by that magnetic flux flowing through the write shield layer 60 is incrementally expanded.

It is here understood that the whole structure of the thin-film magnetic head as described above is disclosed by way of example alone; it could be modified in various ways.

Such a thin-film magnetic head is fabricated by forming the respective components in order and stacking them one upon another using existing thin-film processes including film-formation techniques represented by plating or sputtering, patterning techniques represented by photo-lithography techniques, and etching techniques represented by dry etching or wet etching.

Figure 3:
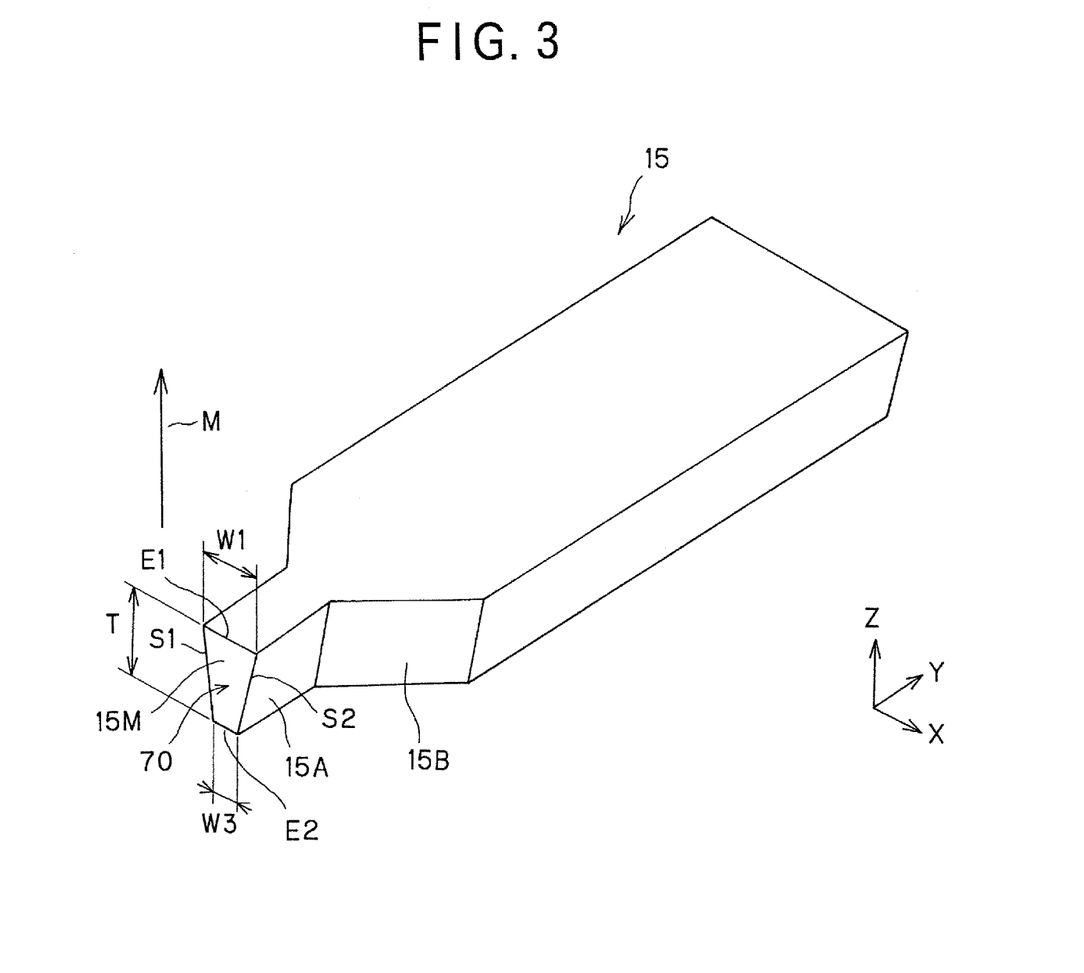
FIG. 3 is a perspective view of the form of the main magnetic pole 15.

FIG. 3 is illustrative in perspective of only the main magnetic pole 15 removed from the whole structure. As already described, the main magnetic pole 15 assumes on a substantially battledore type pattern shape comprising, in order from its side near to the air bearing surface 70, a front end 15A that is a magnetic pole portion and a rear end 15B that is a yoke portion.

The front end 15A functions as a substantial portion for releasing a magnetic flux, and has substantially a constant microfine width that defines the recording track width of a magnetic recording medium. For instance, in the rear the width of the rear end 15B is greater than the width of the front end 15A, and in the front, the rear end 15B tapers off toward the front end 15A. And, it is the front end 15A that is the magnetic pole portion that is corresponding to the high aspect-ratio plated film portion referred to in the invention. The aspect ratio is defined by the ratio (T/W1) of depth (T in FIG. 3) to width (W1 in FIG. 3). It is here noted that when there is no constant width involved, the maximum width is adopted as width T1 for figuring out the aspect ratio.

Such a microfine plated film portion has a width W1 of about 10 to 300 nm.

The joining surface of the front 15A and the rear end 15B, viz., the position at which the width of the main magnetic pole 15 starts growing large from the substantially constant width is the so-called flare point FR. This flare point FR provides a position where, upon currents flowing through the main magnetic pole 15 from the rear end 15B toward the front end 15A, a magnetic flux is focused so as to feed a sufficient amount of magnetic flux to the front end 15A: it is an important factor contributing to recording performance.

Explanation of How to Form the Plated Film According to the Invention

How to form the plated film according to the invention is now explained with reference to FIGS. 4A through 4J.

The process of forming the plated film according to the invention is the so-called improved type frame plating process for forming a plated film comprising a high aspect-ratio plated film portion having an aspect ratio of 1 or greater as defined by the depth-to-width ratio.

Corresponding to the plated film portion having a high aspect ratio, for instance, is the front end 15A that is the magnetic pole portion of the aforesaid perpendicular magnetic recording head. FIGS. 4A through 4J are illustrative in section with time of the steps of forming a plated film for forming the front end 15A, as viewed on the X-Z plane and from the side of the air bearing surface 70. Dimensions in the X- and Z-axis directions are here called width and depth (or thickness), respectively.

It is here noted that the rear end 15B of the main magnetic pole 15, for the most part, is made of a low aspect-ratio plated film portion having an aspect ratio of less than 1. It follows that in a slight region directing toward the joining surface of the front end 15A and the rear end 15B, there is possibly an area having an aspect ratio of greater than 1; however, the most part of the rear end 15B except that is made of a low aspect-ratio plated film portion having an aspect ratio of less than 1. In the low aspect-ratio plated film portion having an aspect ratio of less than 1, there is no or little problem with the creation of pores (cavities) to be solved by the invention, because upon plated film growth, it is hardly affected by plating growth from the inner wall surface at which there are standing waves. Thus, it is not necessary to apply the process of forming a plated film according to the invention to the low aspect-ratio plated film portion having an aspect ratio of less than 1. However, the process of forming a plated film according to the invention may just as well applied to a composite form having both a low aspect-ratio plated film portion having an aspect ratio of less than 1 and a high-aspect ratio plated film portion having an aspect ratio of greater than 1 with making no distinction between them and for the sake of facilitation of fabrication.

The process steps are now explained in order.

(1) Step of Providing a Substrate

Figure 4A:
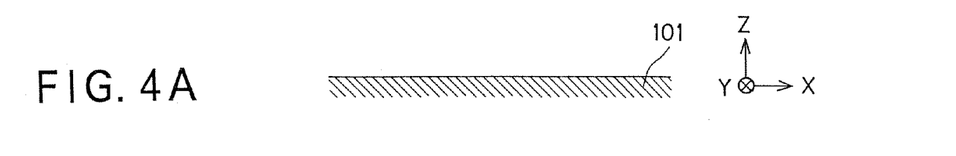
FIGS. 4A to 4J are illustrative with time of how to form the plated film according to the invention; they are illustrative in section of the front end 15A in particular.

For the process of forming a plated film according to the invention, a substrate 101 for forming a plated film on it is first provided, as shown in FIG. 4A.

(2) Step of Forming a Resist Pattern

Then, a photoresist is coated on the surface of the substrate 101 using spin coating as an example, if required with heating (baking) of the photoresist, thereby forming a photoresist film. Note here that for the substrate 101, various substrates or various films may be used provided that they are capable of supporting the photoresist film.

Figure 4B:
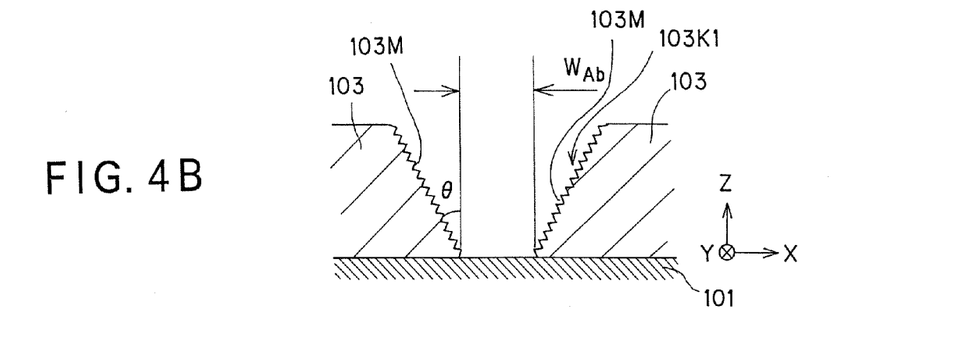

Then, photolithography is used for the patterning of the photoresist film (selective exposure and development for pattern formation) to form a resist pattern 103 (resist 103) with a concave opening having a first opening portion 103K1, as depicted in FIG. 4B. The whole of the concave opening may just as well be configured in such a way as to receive the main magnetic pole 15 illustrated typically in FIG. 3 in its entirety; however, what is important for the invention is that the first opening 103K1 provides a base for the formation of a plated film portion having an aspect ratio of greater than 1.

As depicted in FIG. 4B, the inner wall surface 103M of the resist pattern 103 inclines at an angle of inclination θ; the first opening 103K is formed such that its width grows wide with a distance from the substrate 101. The angle of inclination θ is an angle of the inner wall surface 103M with a perpendicular to one surface of the substrate 101, and may be set as desired, usually in the range of about 3 to 15°.

At the inner wall surface 103M, there is a standing wave formed, as shown by a broken line in FIG. 4B. This standing wave occurs when the photoresist coated on the surface of the substrate 101 is exposed to monochromatic light to form the resist pattern 103 having the opening 103K1 (of, e.g., a concave groove shape); it is caused by a portion where light coming the resist and light reflected off the surface of the substrate is well periodically amplified according to wavelength. In other words, there is a standing wave occurring at the inner wall surface 103M of the resist at a site with the opening formed, according to the amplified period.

Note here that for the exposure of the photoresist film, for instance, various exposure light sources such as steppers or scanners may be used.

(3) Step of Forming an Inorganic Film

Figure 4C:
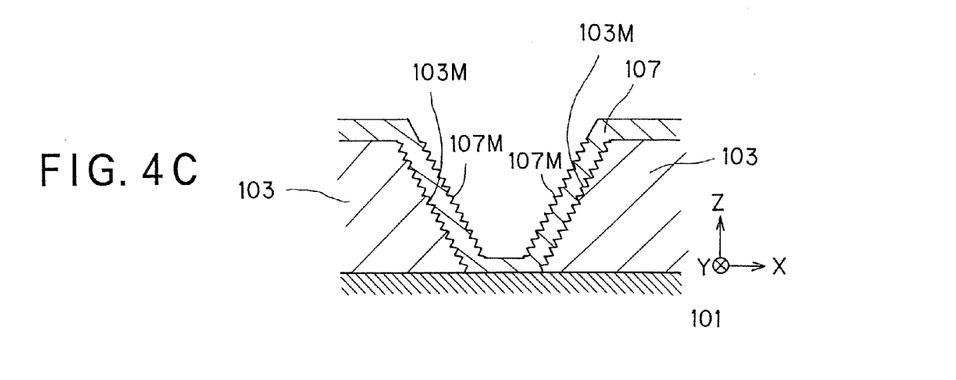

Then, the step of forming an inorganic film is carried out to apply an inorganic film 107 to the bottom (where the substrate 102 is exposed to view (FIG. 4B)) and inner wall surface 103M (FIG. 4B) of the first opening 103K1 formed with the resist pattern 103, as depicted in FIG. 4C. At this step, as shown, the inorganic film 107 may be applied to the bottom and-inner wall surface 103M of the first opening 103 plus the upper plane of the resist 103.

Such inorganic film 107 may be formed by the deposition of an inorganic material such as $Al_2O_3$ or $SiO_2$ by sputtering, CVD or the like. The thickness of deposition of the inorganic film is typically about 30 to 50 nm.

(4) Step of Flattening the Inorganic Film at the Inner Wall Surface

Figure 4D:
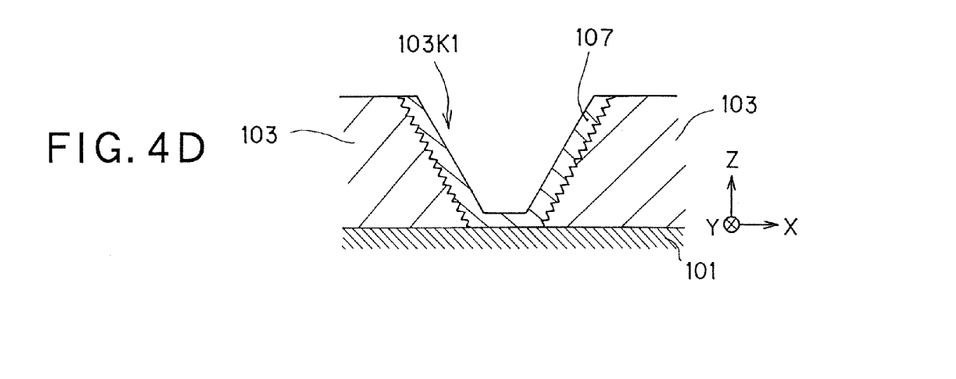

Then, the step of flattening the inorganic film at the inner wall surface is carried out to flatten the surface of the inorganic film 107 formed at the aforesaid inorganic film-formation step, thereby flattening the surface of the inorganic film formed on the inner wall surface of the first opening 103K1, as depicted in FIG. 4D. More exactly, this step is carried out for the purpose of reducing or eliminating asperities 107M (see FIG. 4C) at the surface of the aforesaid inorganic film, which are formed by the tracing of the standing wave formed on the inner wall surface 103M of the first opening 103K1 in the resist pattern by the aforesaid resist pattern-formation step.

Such surface flattening for the inorganic film 107 is preferably done with the use of, for instance, milling, reactive ion etching (RIE), wet etching using an alkali aqueous solution as an etchant, or the like.

Referring here to the surface form of such flattened inorganic film 107 at the inner wall surface, the surface form of the inorganic film 107 on its side in contact with the resist 103 is not traced there, as depicted in FIG. 4D; that is, both the surface forms of the inorganic film 107 are asymmetric. In this connection, in the state of the inorganic film 107 prior to flattening depicted in FIG. 4C, the form of the standing wave remains intact on both surfaces of the inorganic film 107 in a symmetrical form.

Note here that, by this flattening, the inorganic film 107 (see FIG. 4C) formed on the upper plane of the resist 103 is partly or entirely etched out (FIG. 4D illustrates that the whole is etched out).

(5) Step of Forming a Seed Film

Figure 4E:
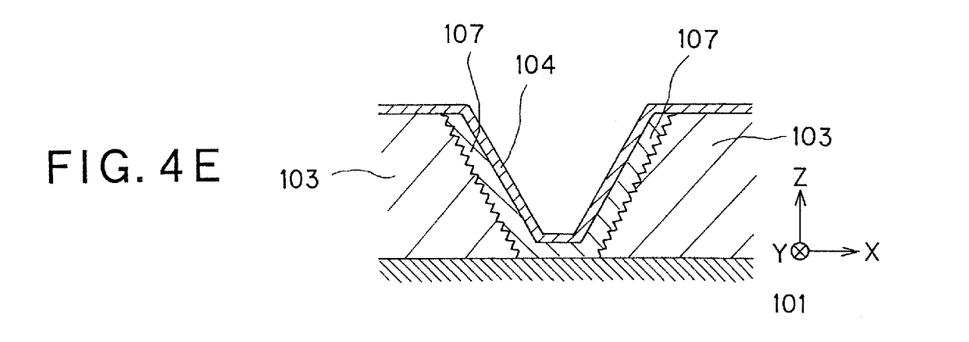

Then, the seed film-formation step is carried out to form a seed film 104 on the inorganic film 107 at the first opening 103K1, which provides a plating seed (electrode film), as depicted in FIG. 4E. The seed film 104 is formed by a technique such as sputtering or CVD, with its composition being preferably the same as that of the film to be formed by plating later. Note here that prior to the formation of the seed film 104, an adhesion-enhancement layer such as Cr or Ti may just as well be formed in advance. As depicted in FIG. 4E, the seed film 104 is usually formed in such a way as to provide covers not merely on the inorganic film 107 forming the opening but also on the upper surface of the resist 103. The seed film 104 has a thickness of about 30 to 50 nm.

(6) Step of Forming a Plated Film

Figure 4F:
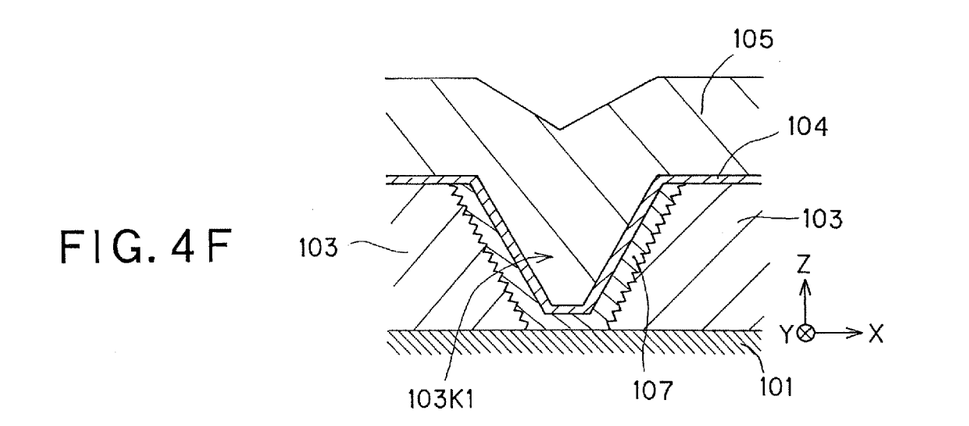

Then, the seed film 104 is used as an electrode layer to implement the plated film-formation step at which a plated film 105 comprising a magnetic material grows in such a way as to fill up the first opening 103K1, as depicted in FIG. 4F. In the embodiment here, the plated film is formed until the first opening 103K1 is filled up as far as its periphery. Although not illustrated, this is because even an opening larger than the first opening 103K1, for instance, an opening for the formation of the rear end 15B of the main magnetic pole 15 (see FIG. 3) must be filled up with the plated film.

The composition of the plating bath used may be properly determined with the plated film to be formed in consideration, and plating conditions such as current density and bath temperature may be properly determined, too.

Note here that at this plated film-formation step, the plated film may be formed with the application of a magnetic field in a given direction, and the direction of application of the magnetic field may be altered at some point during film-formation.

(7) Step of Flattening the Plated Film

Figure 4G:
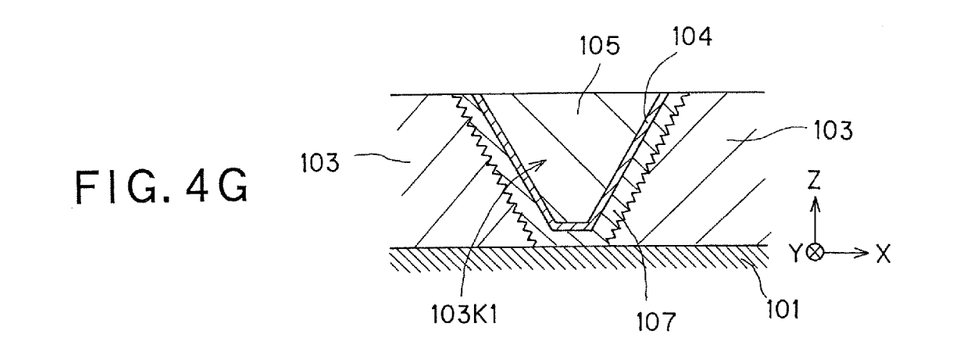

Following the completion of such a plated film-formation step, there is the plated film-flattening step at which, as depicted in FIG. 4G, the plated film 105 is flattened until the resist 103 is exposed to view. At this plated film-flattening step, a polishing technique such as chemomechanical polishing (CMP) is used to flatten the plated film 105 at least until the resist pattern 103 is exposed to view. Then, the seed film 104 together with that plated film 105 is partly removed off, so that there can be a form obtained, in which form only the plated film 105 buried in the first opening 103K1 remains, as depicted in FIG. 4G. In this case, even after the resist pattern 103 is exposed to view, the flattening of the plated film 105 may be kept on to adjust the thickness of the plated film 105. Note here that the plated film-flattening step may be implemented by dry etching techniques (such as milling or RIE), or the combined use of dry etching and CMP.

(8) Step of Removing the Resist

Figure 4H:
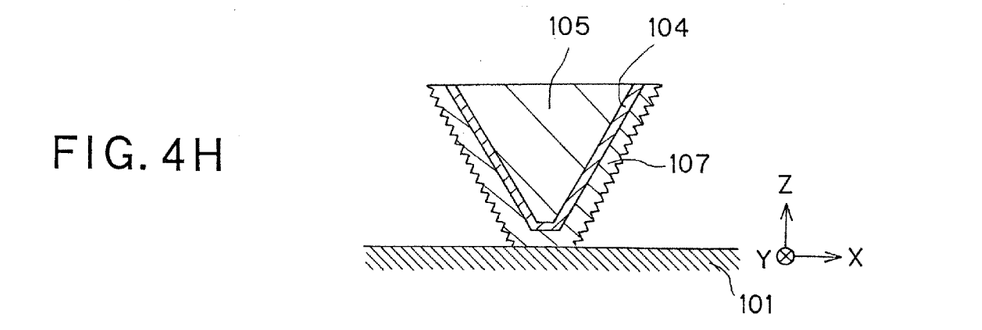

Following the completion of such a plated film-flattening step, there is the resist removal step of removing the resist pattern 103, as depicted in FIG. 4H. That is, the resist pattern 103 is removed with the use of an organic solvent such as isopropyl alcohol (IPA), N-methyl-2-pyrrolidone (NMP) or acetone to allow the inorganic film 107, seed film 104 and plated film 105 to remain on the substrate 101.

(9) Step of Forming a Flattening Film

Figure 4I:
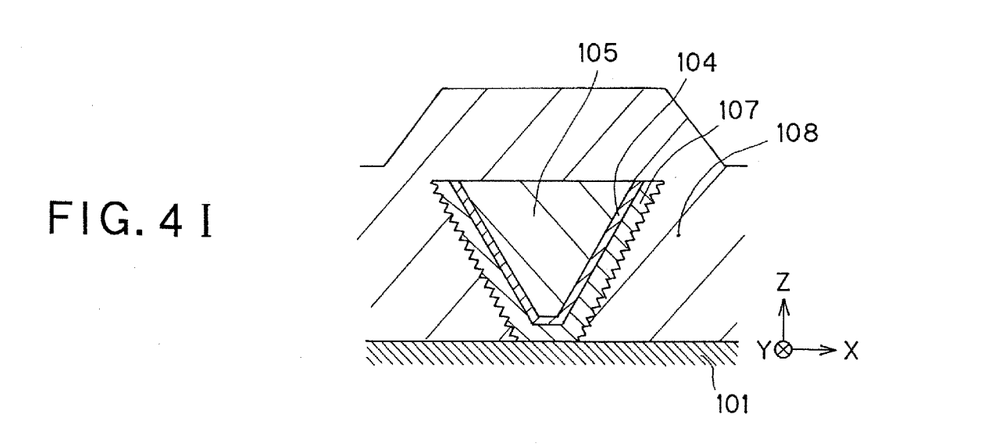

Following the completion of such a resist removal step, there is the flattening film-formation step of forming a flattening film 108 used for flattening purposes, as depicted in FIG. 4I. More exactly, a film-formation technique such as sputtering is used to deposit a flattening film 108 comprising an $Al_2O_3$ or other inorganic film on the plated film 105 and substrate 101 in such a way that the plated film 105 is embedded in it. As depicted in FIG. 4I, usually, the flattening film 108 deposited on the substrate 101 has a thickness that exceeds at least the height of the plated film 105.

(10) Flattening Step

Figure 4J:
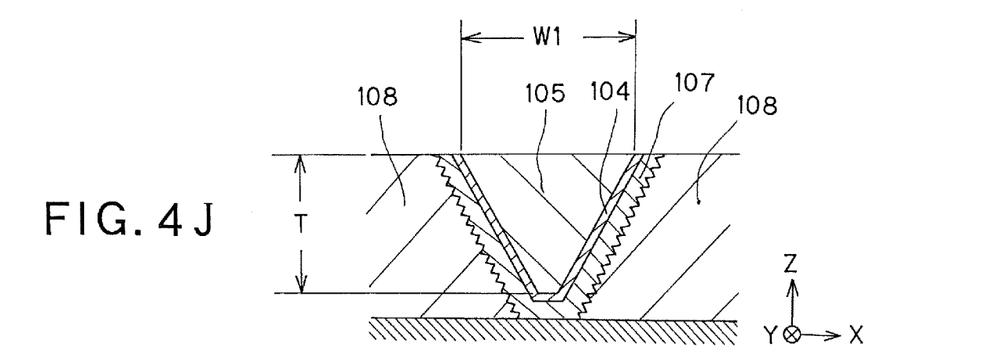

Following the completion of such a flattening film-formation step, there is the flattening step of flattening the deposited inorganic flattening film 108, as depicted in FIG. 4J. At this flattening step, a polishing technique such as chemomechanical polishing (CMP) is used to flatten the inorganic film 108 at least until the plated film 105 is exposed to view. In this case, even after the plated film 105 is exposed to view, the flattening of the flattening film 108 may be kept on to adjust the thickness of the plated film 105. Thus, the plated film 105 is substantially completed. The aspect ratio of the completed plated film is represented by (thickness T/maximum width W1), and reaches as high as 1 or greater. That the plated film has a high aspect-ratio plated portion having an aspect ratio of 1 or greater is a prerequisite for the invention for the following reason. As a result of intensive studies by the inventors, it has experimentally be found that when a high aspect-ratio plated film having an aspect ratio of 1 or grater is prepared by the so-called improved type frame plating, there are pores (cavities) occurring in a substantial center portion of the plated film—the problem to be solved by the invention. Note here that FIGS. 4B to 4J are conceptual illustrations where the angle of inclination θ is extremely exaggerated for a better understanding of how to form the plated film according to the invention; the aspect ratios read out of the drawings are not correct ones.

The present invention is now explained in further details with reference to some specific experiments.

Using the process of forming the plated film according to the invention and the process of fabricating the magnetic device according to the invention, the main magnetic pole 15, shown in FIGS. 2 and 3, was prepared. Then, a thin-film magnetic head sample comprising a perpendicular recording head portion having that main magnetic pole 15 was prepared, thereby conducting experimentation for making sure the effectiveness of the invention.

PREPARATION OF A SAMPLE ACCORDING TO EXAMPLE 1

The main magnetic pole 15 that was part of the invention and had such configuration as illustrated in FIG. 3 was prepared according to the following specific procedure. Note here that Example 1 will be described primarily about the preparation of the front end 15A of the main magnetic pole 15 that was a high aspect-ratio plated film portion with reference to FIGS. 4A to 4J.

A series of fabrication steps just prior to the formation of the main magnetic pole 15 are left out. An arrangement prior to the formation of the main magnetic pole 15 will be understood from the head structure shown typically shown FIG. 1B. Thus, reference numeral 101 given in FIG. 4A is corresponding to the surface for the formation of the main magnetic pole 15 just before the formation of the main magnetic pole 15 of the perpendicular recording head.

A resist (SEPR Series for Edge Tapers made by The Shin-Etsu Chemical Co., Ltd.) was coated on a surface for the formation of the main magnetic pole 15 (corresponding to reference numeral 101 in FIG. 4A), and then pre-baked at 90° C. for 90 seconds to form a resist film of 0.5 μm in thickness. Then, exposure, PBE and development were carried out the under following conditions.

[Exposure]
  Aligner: NS-TFHEX14D made by Nikon Cooperation
  The mask used: 0.2-μm wide Binary
  Exposure conditions: NA=0.65 Sigma=0.7
  Dose=about 80 mJ/cm$^2$
  Focus=0 μm

[PEB (Post Exposure Bake)]

Post exposure baking was done at a temperature of 100° C. for 90 seconds.

[Development]

A developer comprising a 2.38% TMAH (tetramethyl anhydrite) aqueous solution was used for a 60-second development at one paddle.

In the formed resist pattern form 103, the width of the lowermost layer in FIG. 4B was Wab=150 nm, and the angle of inclination was θ=5 deg.

Then, as depicted in FIG. 4C, the $Al_2O_3$ inorganic film 107 was formed by CVD on the bottom (the site with the substrate 101 exposed to view) and inner wall surface 103M of the first opening 103K1 formed with the resist pattern 103 and the upper plane of the resist 103. The inorganic film had a thickness of 50 nm.

For the film-formation system, PULSAR made by ASM Co., Ltd. was used, the feed gas used was a mixed gas of trimethylaluminum+$H_2O$, the temperature of the substrate was 100° C., and the reaction pressure involved was $5 \times 10^{-2}$ Pa.

Then, as depicted in FIG. 4D, the surface of the inorganic film 107 was milled to flatten the surface of the inorganic film formed at the inner wall surface of the first opening 103K1. The purpose of this flattening was to reduce or eliminate the surface asperities 107M (see FIG. 4C) of the inorganic film 107 formed by the tracing of a standing wave occurring at the inner wall surface 103M of the first opening 103K1 in the resist pattern at the resist pattern-formation step.

Milling was done at the following conditions.
Milling system: IBD-IBE made by Veeco Co., Ltd.
Gas: Argon
Pressure: $2 \times 10^{-4}$ Torr
Beam current: 300 mA
Beam voltage: 300 V (DC)
Accelerating voltage: −500 V
Milling angle: 90° (relative to the substrate)

The thus flattened inorganic film 107 at the inner wall surface was in a surface configuration with no trace of the inorganic film 107 on its side in contact with the resist 103, as depicted in FIG. 4D; both surface configurations of the inorganic film 107 were asymmetric, as later confirmed by sectional SEM observation.

Note here that the inorganic film 107 formed by milling on the upper plane of the resist 103 was etched out.

Then, the seed film 107 having a $Ni_{50}Fe_{50}$ composition and acting as an electrode film was formed at a thickness of 30 nm by means of sputtering (FIG. 4E).

Then, a plated film having a $Ni_{50}Fe_{50}$ composition was grown to a thickness of 0.5 μm in such a way as to fill up the opening, thereby forming a plated film that provided a base for the main magnetic pole 15 (FIG. 4F).

Then, the plated film 105 was flattened by means of chemomechanical polishing (CMP) until the resist 103 was exposed to view. More specifically, polishing was done using foamed urethane pads and an alumina slurry (having a particle diameter of 250 nm) until the film thickness reached 0.4 μm (FIG. 4G).

Then, the resist pattern 103 was shaken while immersed in IPA (isopropyl alcohol), thereby dissolving and stripping off the resist pattern 103 (FIG. 4H).

Then, $Al_2O_3$ was formed into a 1.0-μm thick film by means of sputtering for the formation of a film for flattening the inorganic film (FIG. 4I).

Then, chemomechanical polishing was applied to flatten the flattening film 108 for the inorganic film until the thickness of the plated film reached 0.4 μm (FIG. 4J).

The plated film of the thus completed front end 15A of the main magnetic pole 15 had an aspect ratio of 1.8, as represented by (thickness T/maximum width W1).

PREPARATION OF A SAMPLE ACCORDING TO COMPARATIVE EXAMPLE 1

The aforesaid Example 1 was repeated but the step of flattening the inorganic film at the inner wall surface was not carried out. To be more specific, there was no step of milling and thereby flattening the surface of the inorganic film formed at the inner wall surface of the first opening 103K1 as shown in FIG. 4D. In the sample of Comparative Example 1, there was a trace of the standing wave occurring at the inner wall surface 103M of the first opening 103K1 in the resist pattern at the resist pattern-formation step; the standing wave remained formed at the surface of the inorganic film 107. It follows that the configuration of FIG. 4C remained intact.

The sample of Comparative Example 1 was prepared the way otherwise was the same as in Example 1.

Regarding the thus prepared samples of Example 1 and Comparative Example 1, respectively, how many pores (cavities) occurred in the plated film (having an aspect ratio of 1.8 as mentioned above) at the front end 15A of the main magnetic pole 15 was found (%) according to the following method.

(Measurement of How Many Pores (Cavities) Occurred in the Plated Film (%))

About 30,000 samples were prepared on an AlTiC substrate of 2 mm in thickness and 6 inches in diameter, and 10 were arbitrarily extracted out of the 30,000 samples. The front end 15A of each main magnetic pole 15 was cut by FIB (focused ion beam) for SEM observation of its section to find how many pores (cavities) occurred.

This operation was carried out with 10 substrates; a total of 10×10=100 samples were obtained. By SEM observation of sections, whether there was a standing wave at the interface between the inorganic film 107 and the seed film 104 was also measured.

The results are set out in Table 1.

TABLE 1

| Sample No. | Standing wave | Pores (cavities) count (%) |
|---|---|---|
| Ex. 1 | Not found | 0 |
| Comp. Ex. 1 | Found | 98 |

The advantages of the invention would be evident from the aforesaid results. That is, with the process of forming a plated film according to the invention, the surface asperities of the inorganic film formed by the tracing of a standing wave occurring at the inner wall surface of the first opening in the resist at the resist pattern-formation step are reduced or eliminated. It is thus possible to form, efficiently yet in a short period of time, a high aspect-ratio plated film portion having an aspect ratio of greater than 1. In addition, the formed plated film quality is extremely improved for the absence of pores (cavities).

What we claim is:

1. A process of forming a plated film having a high aspect-ratio plated film portion having an aspect ratio of 1 or greater as defined by a depth-to-width ratio, comprising:
a step of providing a substrate;
a resist pattern-formation step of forming a resist pattern having a first opening that provides a base for the high aspect-ratio plated film portion having the aspect ratio of 1 or greater, the first opening having surface asperities formed by tracing of a standing wave occurring at an inner wall surface of the first opening;

an inorganic film-formation step of applying an inorganic film on at least a bottom and the inner wall surface having the surface asperities of said first opening;

a flattening step of flattening a surface of said inorganic film formed at said inorganic film-formation step to flatten the surface of the inorganic film formed on the inner wall surface of said first opening to eliminate surface asperities of said inorganic film formed by tracing of the standing wave occurring at the inner wall surface of the first opening in said resist at said resist pattern-formation step;

a seed film-formation step of forming on the inorganic film at the first opening a seed film that provides a plating seed; and a plated film-formation step of growing a plated film comprising a magnetic material in such a way as to fill up said first opening, wherein said resist pattern-formation step involves forming a photoresist film on one surface of the substrate, and then subjecting said photoresist film to selective exposure and development, thereby forming a resist pattern having said first opening.

2. The process of forming a plated film according to claim 1, wherein the step of flattening the surface of said inorganic film is milling, reactive ion etching (RIE), or wet etching using an alkali aqueous solution as an etchant.

3. The process of forming a plated film according to claim 1, wherein a surface configuration of said flattened inorganic film at said inner wall surface has no trace of surface configuration of said inorganic film on a side in contact with the resist.

4. The process of forming a plated film according to claim 1, further including a plated film-flattening step of applying further flattening to said plated film until a part of the surface of said inorganic film is removed or the resist pattern is exposed to view, after said plated film-formation step.

5. The process of forming a plated film according to claim 4, further including a resist removal step of removing the resist pattern after said flattening step of flattening the surface of said inorganic film.

6. The process of forming a plated film according to claim 5, further including a flattening step of forming a flattening film for achieving flattening after said resist removal step.

7. The process of forming a plated film according to claim 6, further including a flattening step of achieving further flattening after said flattening film-formation step.

8. A process of fabricating a magnetic device having a magnetic film, wherein the process of forming a plated film according to claim 1 is used to form a magnetic film in such a way as to have a high aspect-ratio plated film portion buried in a first opening.

9. A process of fabricating a perpendicular magnetic recording head comprising a thin-film coil adapted to generate a magnetic flux and a magnetic pole layer adapted to guide a magnetic flux produced at said thin-film coil to a magnetic recording medium, wherein the process of forming a plated film according to claim 1 is used to form a magnetic pole layer in such a way as to have a high aspect-ratio plated film portion buried in a first opening.

* * * * *